United States Patent
Taniyama et al.

(10) Patent No.: US 8,820,076 B2
(45) Date of Patent: Sep. 2, 2014

(54) SOLAR HEAT COLLECTING APPARATUS AND SOLAR POWER GENERATION SYSTEM

(75) Inventors: Yoshihiro Taniyama, Tokyo (JP);
Katsuya Yamashita, Tokyo (JP);
Masahiko Takahashi, Yokosuka (JP);
Tatsuro Uchida, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 245 days.

(21) Appl. No.: 13/425,634

(22) Filed: Mar. 21, 2012

(65) Prior Publication Data
US 2012/0247102 A1  Oct. 4, 2012

(30) Foreign Application Priority Data
Mar. 23, 2011  (JP) .................. 2011-064517

(51) Int. Cl.
| F24J 2/04 | (2006.01) |
| F03G 6/00 | (2006.01) |
| F24J 2/07 | (2006.01) |
| F24J 2/24 | (2006.01) |
| F22B 1/00 | (2006.01) |
| F24J 2/16 | (2006.01) |
| F24J 2/10 | (2006.01) |
| F24J 2/34 | (2006.01) |

(52) U.S. Cl.
CPC .. *F24J 2/07* (2013.01); *F24J 2/245* (2013.01); *Y02E 10/41* (2013.01); *F22B 1/006* (2013.01); *F24J 2/16* (2013.01); *F24J 2/0494* (2013.01); *Y02E 10/44* (2013.01); *F24J 2/1047* (2013.01); *Y02E 10/46* (2013.01); *F24J 2/345* (2013.01)
USPC ......................................... 60/641.8; 126/651

(58) Field of Classification Search
CPC ........... F03G 6/003; F03G 6/005; F03G 6/02; F03G 6/06; F03G 6/065; F03G 6/067
USPC ......... 60/641.1, 641.8–641.15; 126/569, 640, 126/643, 650, 651, 700; 165/908
See application file for complete search history.

(56) References Cited

U.S. PATENT DOCUMENTS 3,894,685 A * 7/1975 Keyes et al. .................. 126/616
3,957,109 A * 5/1976 Worthington ................ 165/48.2
(Continued)

FOREIGN PATENT DOCUMENTS

| JP | 57006262 A | * | 1/1982 | ................ F24J 3/02 |
| JP | 57082649 A | * | 5/1982 | ................ F24J 3/02 |
| JP | 58110988 A | * | 7/1983 | ................ F28D 7/10 |

OTHER PUBLICATIONS

Extended European Search Report mailed Dec. 21, 2012, in corresponding EP 12 16 0714 (English Translation provided.).

*Primary Examiner* — Thomas Denion
*Assistant Examiner* — Mickey France
(74) *Attorney, Agent, or Firm* — Harness, Dickey & Pierce, P.L.C.

(57) ABSTRACT

According to one embodiment, a solar heat collecting apparatus comprises a first heat exchanging unit and a second heat exchanging unit. The first heat exchanging unit includes a first pipe through which a heat medium flows and a first heat receiving face which receives heat of sunlight reflected by a plurality of reflecting units. The first heat exchanging unit heats the heat medium flowing through the first pipe by using heat of the first heat receiving face. A second heat exchanging unit includes a second pipe through which the heat medium heated by the first heat exchanging unit flows, a second heat receiving face which receives heat of the sunlight reflected by a plurality of reflecting units, and a nozzle provided to the second pipe to discharge the heat medium flowing through the second pipe toward a back face of the second heat receiving face.

19 Claims, 6 Drawing Sheets

(56) References Cited

U.S. PATENT DOCUMENTS

| | | | |
|---|---|---|---|
| 4,002,032 A * | 1/1977 | Bash | 60/641.15 |
| 4,003,365 A * | 1/1977 | Wiegand et al. | 126/640 |
| 4,085,730 A * | 4/1978 | Severson et al. | 126/647 |
| 4,111,187 A * | 9/1978 | Wiegand | 126/634 |
| 4,141,498 A * | 2/1979 | Marschner | 237/1 R |
| 4,172,766 A * | 10/1979 | Laing et al. | 202/173 |
| 4,173,253 A * | 11/1979 | Wiegand | 165/48.2 |
| 4,237,868 A * | 12/1980 | Overton | 126/624 |
| 4,306,544 A * | 12/1981 | Clemens | 126/639 |
| 4,344,418 A * | 8/1982 | Leroy | 126/587 |
| 4,404,961 A * | 9/1983 | Stuhlman | 126/647 |
| 5,483,950 A * | 1/1996 | Keintzel et al. | 126/680 |
| 5,850,831 A | 12/1998 | Marko | |
| 2004/0244376 A1 | 12/2004 | Litwin et al. | |
| 2007/0221210 A1* | 9/2007 | Polk | 126/701 |
| 2009/0250051 A1* | 10/2009 | Lata Perez | 126/680 |
| 2011/0139888 A1* | 6/2011 | Levin | 239/13 |
| 2012/0031351 A1* | 2/2012 | Rop | 122/491 |
| 2012/0090323 A1* | 4/2012 | Gonzales et al. | 60/641.1 |

* cited by examiner

SOLAR HEAT COLLECTING APPARATUS AND SOLAR POWER GENERATION SYSTEM

CROSS REFERENCE TO RELATED APPLICATIONS

This application is based upon and claims the benefit of priority from the prior Japanese Patent Application No. 2011-64517, filed on Mar. 23, 2011, the entire contents of which are incorporated herein by reference.

FIELD

Embodiments described herein relate generally to a solar heat collecting apparatus and a solar power generation system.

BACKGROUND

Renewable energy such as wind generation which does not generate carbon dioxide during operation in contrast to a power-generation plant such as a conventional thermal power generation system which burns fossil fuel is becoming more popular from a viewpoint of suppressing global warming. As a type of such alternative energy, solar power generation which is power generation by heating a heat medium with heat obtained by collecting sunlight and driving a turbine by using heat capacity of the heat medium as an energy source is attracting attention. Solar power generation can be carried out by utilizing a technique and a facility similar to those of the conventional thermal power generation system and it is possible to obtain higher output from the solar power generation than from other types of renewable energy.

As a light collecting solar power generation system, some types of systems including a trough type, a tower type, and a dish type have been developed. The system basically obtains energy by collecting the sunlight to a high density and includes mirrors for reflecting the sunlight, a heat receiving unit for receiving the reflected light and transferring the heat to a heat medium, and an energy converting system such as a steam generator and a turbine/power generator.

Because higher power generation efficiency is obtained in the light collecting solar power generation system when an upstream temperature in a turbine cycle, i.e., a temperature of the heat medium is higher, increase of a heat transfer coefficient in the heat receiving unit is desired.

DETAILED DESCRIPTION

According to one embodiment, a solar heat collecting apparatus comprises a first heat exchanging unit and a second heat exchanging unit. The first heat exchanging unit includes a first pipe through which a heat medium flows and a first heat receiving face which receives heat of sunlight reflected by a plurality of reflecting units. The first heat exchanging unit heats the heat medium flowing through the first pipe by using heat of the first heat receiving face. A second heat exchanging unit includes a second pipe through which the heat medium heated by the first heat exchanging unit flows, a second heat receiving face which receives heat of the sunlight reflected by a plurality of reflecting units, and a nozzle provided to the second pipe to discharge the heat medium flowing through the second pipe toward a back face of the second heat receiving face.

An embodiment of the present invention will be described below based on the drawings.

Figure 1:
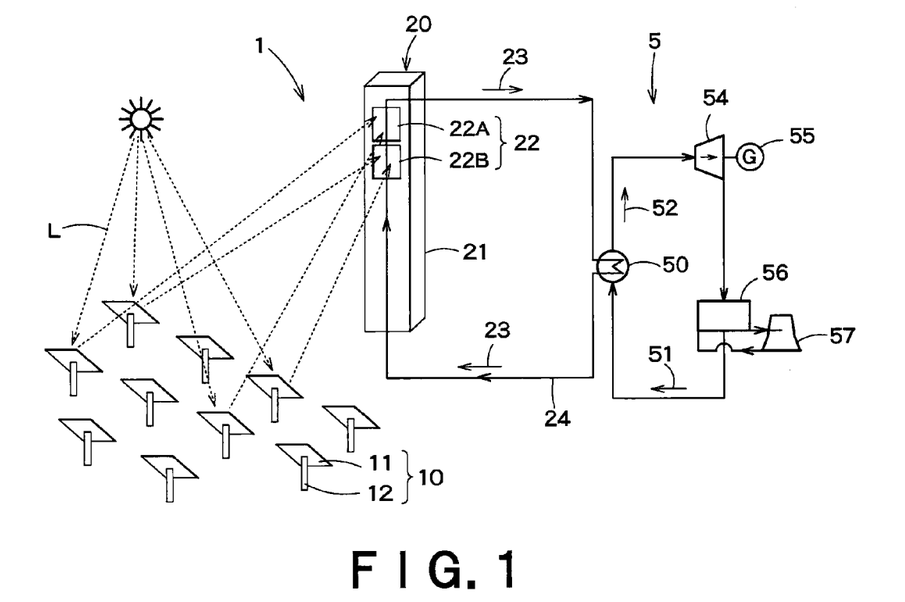
FIG. 1 is a schematic block diagram of a solar power generation system according to an embodiment.

FIG. 1 is a schematic block diagram of a solar power generation system according to the embodiment of the invention. The solar power generation system includes a solar heat collecting apparatus 1 for collecting sunlight and heating a heat medium 23 with heat of the collected sunlight and a power generation unit 5 for generating steam 52 by using the heat medium 23 heated by the solar heat collecting apparatus 1 to thereby generate electric power. As the heat medium 23, water, air, molten salt, or the like is used.

The power generation unit 5 includes a heat exchanger 50 for exchanging heat between the heat medium 23 and water 51 to generate the steam 52, a steam turbine 54 to be driven for rotation by the steam 52, and a power generator 55 connected to a turbine shaft of the steam turbine 54 to generate electric power as the turbine shaft rotates. The steam discharged from the steam turbine 54 is cooled in a condenser 56, turns into the water 51, and is supplied to the heat exchanger 50. A cooling tower 57 for supplying cooling water for cooling the steam is connected to the condenser 56.

The solar heat collecting apparatus 1 includes a plurality of reflecting units 10 for reflecting the sunlight L and a heat collecting device 20 for collecting heat of the sunlight reflected by the reflecting units 10. The heat collecting device 20 includes a tower 21, a heat receiving unit 22 provided in an upper portion of the tower 21 to receive the sunlight reflected by the reflecting units 10, and pipes 24 through which the heat medium 23 flows.

Each of the reflecting units 10 includes a plane mirror 11, a column 12 for supporting the plane mirror 11, and an adjusting mechanism (not shown) for adjusting orientation of the plane mirror 11 following movement of the sun and is called Heliostat. In each of the reflecting units 10, the orientation of the plane mirror 11 is adjusted such that the sunlight reflected by the plane mirror 11 shines on the heat receiving unit 22 of the heat collecting device 20. Therefore, the sunlight reflected by the plurality of reflecting units 10 is concentrated on the heat receiving unit 22.

In the tower 21, the pipes 24 are disposed near the heat receiving unit 22 and the heat medium 23 flows from bottom to the top. The plurality of pipes 24 made of carbon steel, for example, are provided. Heat energy at the heat receiving unit 22 transfers to the heat medium 23 to thereby heat the heat medium 23.

The heat medium 23 is heated while passing through the heat receiving unit 22 exchanges heat with water 51 at the heat exchanger 50 as shown in FIG. 1. The heat medium 23, a temperature of which has been reduced due to the heat exchange, returns to the tower 21. In this manner, the heat medium 23 circulates between the tower 21 and the heat exchanger 50.

Figure 2:
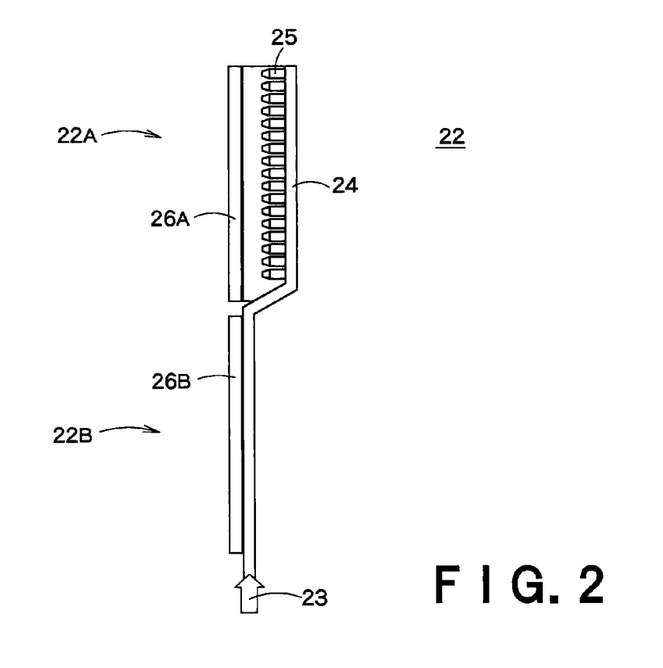
FIG. 2 is a vertical sectional view of a heat receiving unit of a solar heat collecting apparatus according to the embodiment.

FIG. 2 shows a vertical section (a section along a vertical direction) of the heat receiving unit 22. As shown in FIGS. 1 and 2, the heat receiving unit 22 has a heat exchanging unit 22A and a heat exchanging unit 22B provided below the heat exchanging unit 22A. The heat medium 23 heated by the heat exchanging unit 22B is sent into the upper heat exchanging unit 22A and is heated further.

Figure 3:
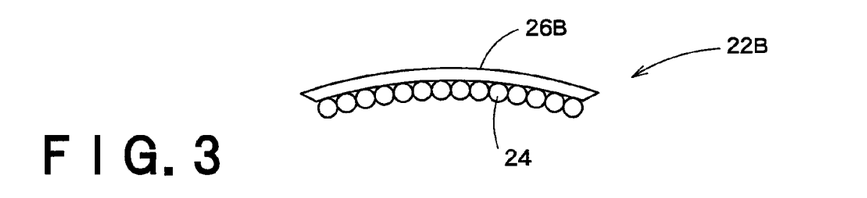
FIG. 3 is a cross-sectional view of a heat exchanging unit.

FIG. 3 shows a cross-section (a section along a horizontal direction) of the heat exchanging unit 22B. As shown in FIGS. 2 and 3, the plurality of pipes 24 are disposed in the heat exchanging unit 22B in such a manner as to be in contact with (or extremely close to) a heat receiving face 26B which receives heat of the sunlight reflected by the reflecting units 10. The heat of the heat receiving face 26B transfers to the heat medium 23 flowing through the pipes 24 to thereby heat the heat medium 23. The heat receiving face 26B is made of SUS, for example.

Figure 4:
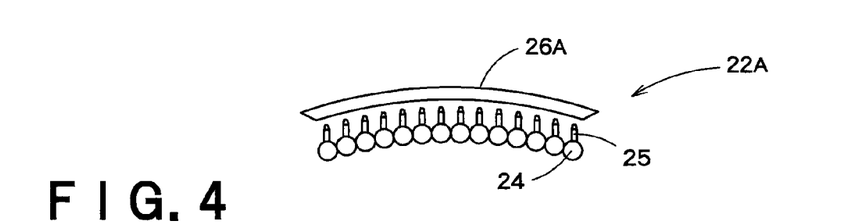
FIG. 4 is a cross-sectional view of a heat exchanging unit.
Figure 5:
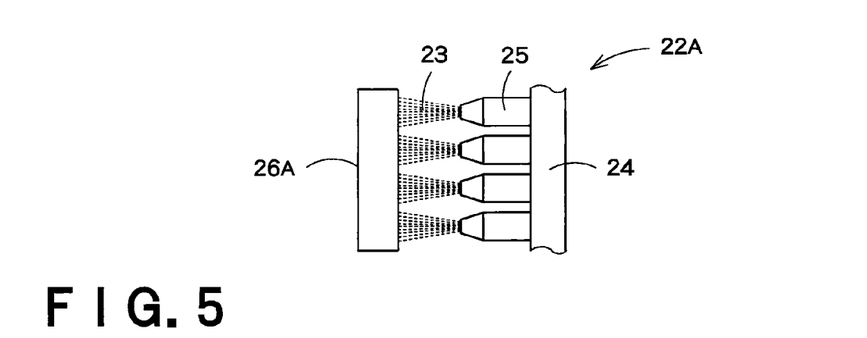
FIG. 5 is a vertical sectional view of the heat exchanging unit.

FIG. 4 shows a cross-section of the heat exchanging unit 22A. As shown in FIGS. 2 and 4, a plurality of nozzles 25 are provided to each of the pipes 24 in the heat exchanging unit 22A to face a heat receiving face 26A which receives the heat of the sunlight reflected by the reflecting units 10. As shown in FIG. 5, the nozzles 25 discharge the heat medium 23 flowing through the pipes 24 toward (a back face of) the heat receiving face 26A. Because the heat medium 23 comes in direct contact with the high-temperature heat receiving face 26A, it is possible to increase a coefficient of heat transfer from the heat receiving face 26A to the heat medium 23 compared to the method in which the heat medium 23 is heated through pipe walls of the pipes 24 as in the heat exchanging unit 22B.

The nozzles 25 are disposed according to a design of the heat energy of the light incident on the heat receiving face 26A, e.g., at regular intervals or in a staggered arrangement. The heat receiving face 26A is made of SUS, for example.

Figure 6:
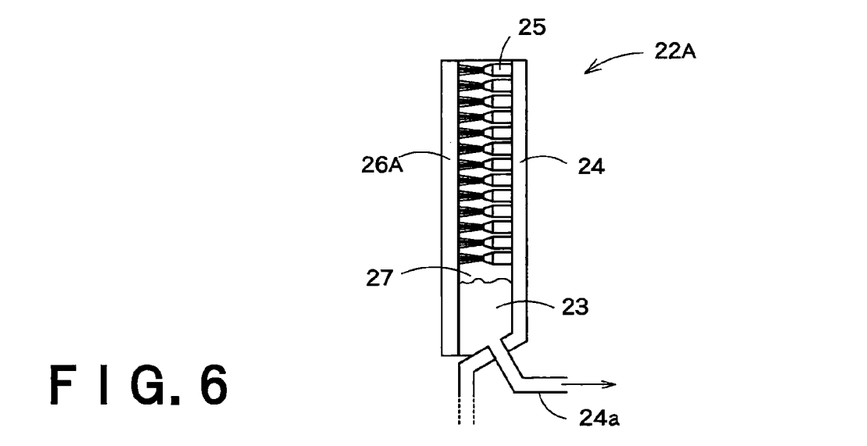
FIG. 6 is a vertical sectional view of the heat exchanging unit.

As shown in FIG. 6, a tank 27 for storing the heat medium 23 is provided in a bottom portion of the heat exchanging unit 22A. The heat medium 23 discharged from the nozzles 25 comes in contact with the heat receiving face 26A, falls down, and is stored in the tank 27. The heat medium 23 can be heated by the heat receiving face 26A while stored in the tank 27. The heat medium 23 stored in the tank 27 is discharged from a pipe 24a. The heat medium 23 discharged from the tank 27 is supplied to the heat exchanger 50. If the heat medium 23 is gas, it is preferable to recover the heat medium 23 heated by the heat receiving face 26A and rising at an upper portion of the heat exchanging unit 22A or to separately provide a pipe for discharging the heat medium 23.

In the heat exchanging unit 22A, upper ends of the pipes 24 may be closed or may not be closed. If the upper ends of the pipes 24 are closed, all the heat medium 23 sent into the heat exchanging unit 22A is discharged from the nozzles 25. If the upper ends of the pipes 24 are not closed, part of the heat medium 23 which is not discharged from the nozzles 25 out of the heat medium 23 sent into the heat exchanging unit 22A is mixed with the heat medium 23 discharged from the tank 27 through the pipe 24a and is supplied to the heat exchanger 50, for example.

As described above, in the embodiment, the nozzles 25 are provided to the pipes 24 to discharge the heat medium 23 toward the back face of the heat receiving face 26A to thereby bring the heat medium 23 and the back face of the heat receiving face 26A into direct contact with each other. Therefore, the heat medium 23 can collect a large amount of heat from the heat receiving face 26A and it is possible to increase the heat transfer coefficient at the heat receiving unit 22. Moreover, the temperature of the heat receiving face 26A can be reduced efficiently by the heat exchange between the heat receiving face 26A and the heat medium 23, which enhances reliability of material forming the heat receiving unit 22.

Figure 7:
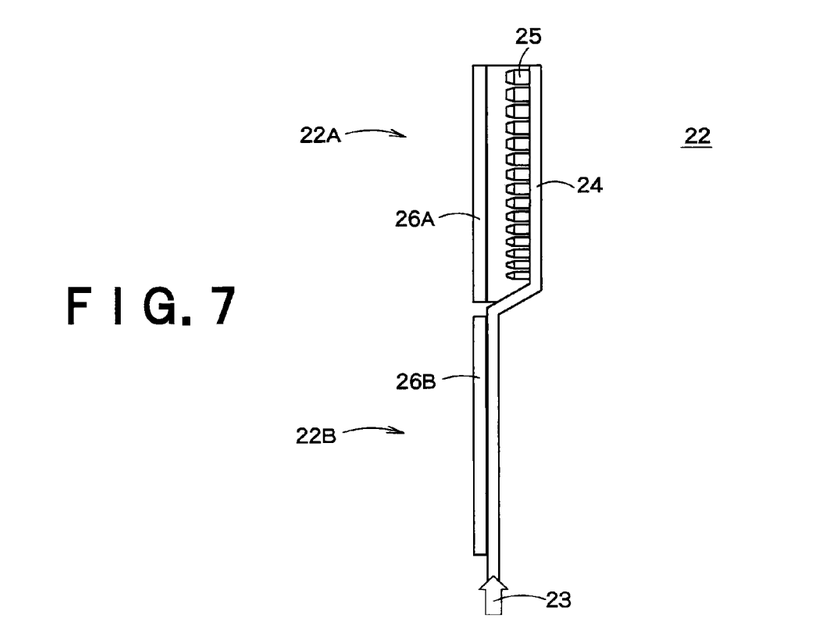
FIG. 7 is a vertical sectional view of a heat receiving unit according to a variation.

Although diameters of discharge ports of the plurality of nozzles 25 provided to the pipes 24 are the same in the above-described embodiment, the diameters of the discharge ports of the nozzles 25 provided to the pipes 24 may be different depending on positions as shown in FIG. 7. In other words, as shown in FIG. 7, the diameters of the discharge ports of the nozzles 25 at upper positions (on a downstream side of the flow of the heat medium 23) may be larger than the diameters of the discharge ports of the nozzles 25 at lower positions (on an upstream side of the flow of the heat medium 23). In this way, it is possible to make amounts of the heat medium 23 discharged from the respective nozzles 25 uniform.

Ratios of the diameters of the nozzles 25 are defined based on friction losses, branching losses, and outlet losses of the heat medium 23 caused in the pipes 24 and are calculated from fluid flow rates, pipe diameters, and the arrangement and the number of the nozzles 25 but do not necessarily have to keep all pressure loss balances.

Figure 8:
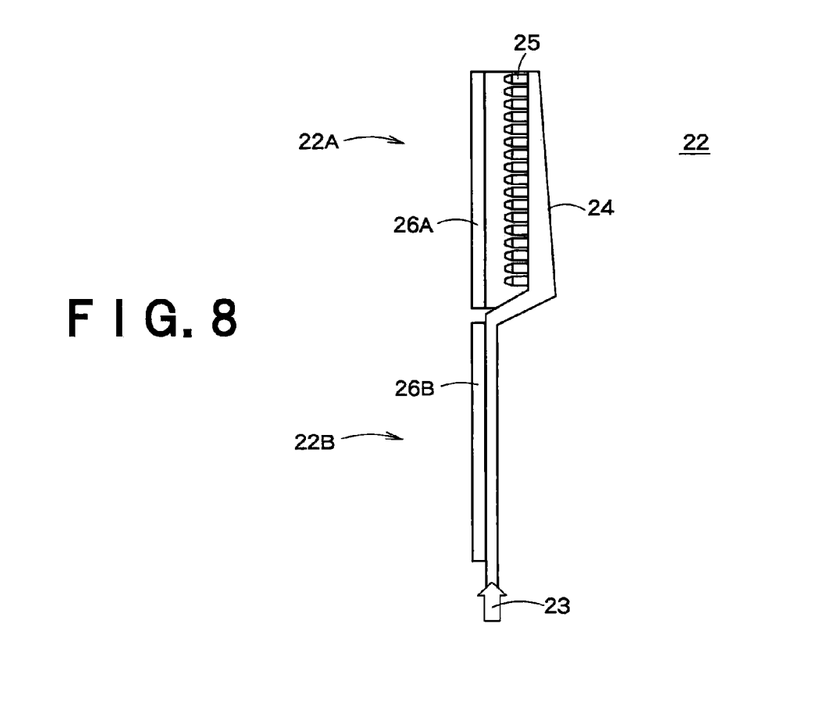
FIG. 8 is a vertical sectional view of a heat receiving unit according to a variation.

As shown in FIG. 8, a diameter of each of the pipes 24 may gradually increase from the top toward the bottom in the heat exchanging unit 22A. In other words, the diameter of the pipe 24 may be larger on the upstream side of the flow of the heat medium 23 than on the downstream side. By forming the pipe 24 in this manner, it is possible to make the amounts of the heat medium 23 discharged from the respective nozzles 25 uniform. An increasing rate of the pipe diameter is calculated from the fluid flow rate, the pipe diameter, and the arrangement and the number of the nozzles 25. The pipes 24 may be circular pipes or rectangular pipes.

Figure 9A:
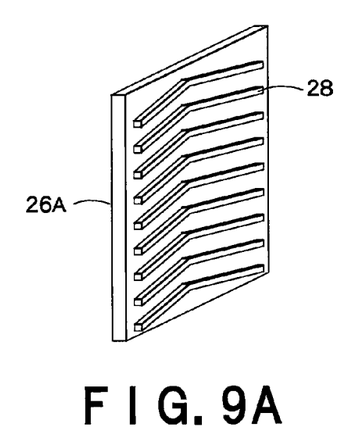
FIGS. 9A and 9B are schematic block diagrams of a heat receiving face according to a variation.
Figure 9B:
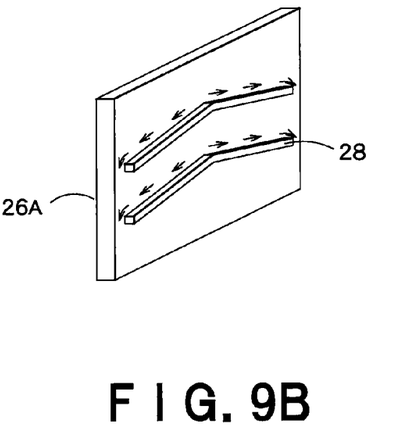

As shown in FIG. 9A, guides 28 may be provided on the back face of the heat receiving face 26A (the face with which the heat medium 23 discharged from the nozzles 25 comes in contact). As shown in FIG. 9B, the heat medium 23 which comes in contact with the back face of the heat receiving face 26A flows leftward and rightward along the guides 28. If the guides 28 are not provided and the heat medium 23 discharged from the nozzles 25 directly flows down on the heat receiving face 26A, the heat medium 23 discharged from the upper nozzles 25 and flowing down may obstruct contact (heat exchange) between the heat medium 23 discharged from the lower nozzles 25 and the heat receiving face 26A. If the guides 28 are provided as shown in FIGS. 9(a) and 9(b), the heat medium 23 once flows leftward and rightward and then flows down and therefore the heat medium 23 discharged from the lower nozzles 25 can also collect a large amount of heat from the heat receiving face 26A.

Figure 10A:
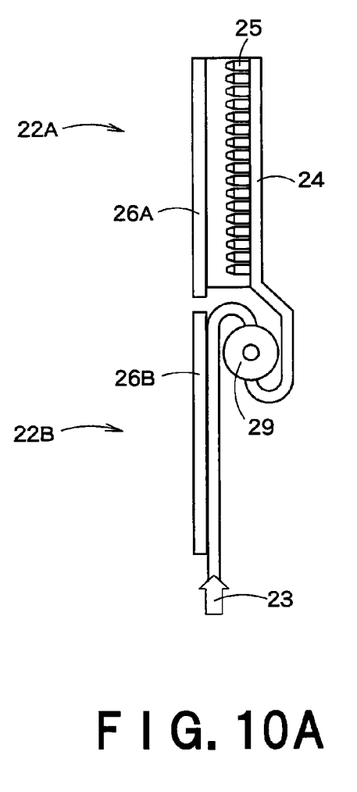
FIGS. 10A and 10B are schematic block diagrams of a heat receiving unit according to a variation.
Figure 10B:
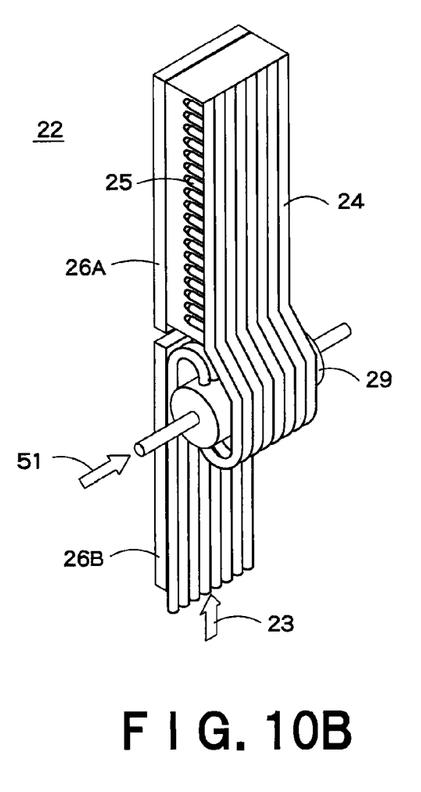

As shown in FIGS. 10A and 10B, a heat exchanging tank (heat exchanger) 29 for causing the heat medium 23 and the water 51 to exchange heat with each other may be provided to the pipes 24 between the heat exchanging unit 22A and the heat exchanging unit 22B. The water 51 is heated by the heat medium 23 in the heat exchanging tank 29 and then supplied to the heat exchanger 50 (see FIG. 1). With this structure, the water 51 can be preheated. Because a temperature of the heat medium 23 supplied to the heat exchanging unit 22A reduces, it is possible to increase an amount of heat which can be collected from the heat receiving face 26A.

A control section for controlling the number of the nozzles 25 for discharging the heat medium 23 may be provided to adjust an amount of the heat medium 23 discharged toward the heat receiving face 26A according to an amount of heat energy incident on the heat receiving face 26A and a surface temperature of the heat receiving face 26A. When the heat energy is insufficient due to a sudden weather change or cloudy weather, by reducing an area of the heat receiving face 26A to be used (an irradiated area with the reflected light) and not discharging the heat medium 23 toward an unused area of the heat receiving face 26A, it is possible to prevent reduction of the temperature of the heat medium 23 discharged from the tower 21.

Figure 11A:
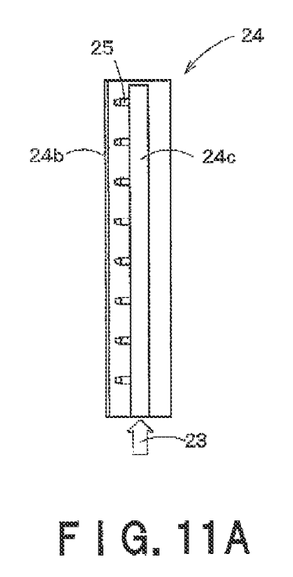
FIGS. 11A and 11B are schematic block diagrams of a heat exchanging unit according to a variation.
Figure 11B:
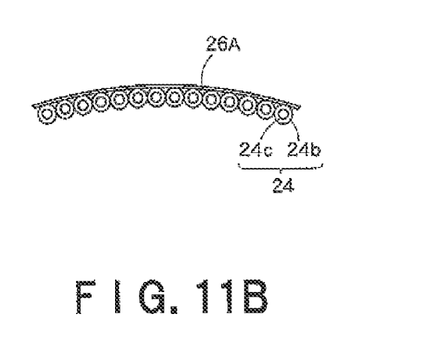

As shown in FIGS. 11A and 11B, each of the pipes 24 in the heat exchanging unit 22A may have a double-pipe structure. The pipe 24 has an outer pipe 24b in contact with the heat receiving face 26A and an inner pipe 24c provided inside the outer pipe 24b. The heat medium 23 flows through the inner pipe 24c. The nozzles 25 are provided to the inner pipe 24c and the heat medium 23 is discharged from the nozzles 25 toward an inner wall face of the outer pipe 24b. The heat medium 23 discharged from the nozzles 25 collects heat from the heat receiving face 26A through the pipe wall of the outer pipe 24b. With this structure, the heat medium 23 can also collect a large amount of heat from the heat receiving face 26A and it is possible to increase the heat transfer coefficient in the heat receiving unit 22.

Figure 12:
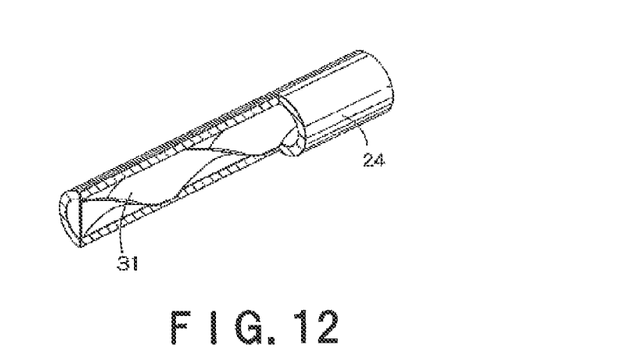
FIG. 12 is a schematic block diagram of a pipe according to a variation.

As shown in FIG. 12, it is possible to provide a swirl structure 31 inside each of the pipes 24 in the heat exchanging unit 22B. By rolling (stirring) the heat medium 23 with the swirl structure 31, it is possible to equalize temperature distribution of the heat medium 23 in the pipe 24 to thereby further increase the heat transfer coefficient in the heat exchanging unit 22B.

Although the structure described in the above embodiment includes the heat exchanging unit 22A for discharging the heat medium 23 from the nozzles 25 toward the heat receiving face 26A and the heat exchanging unit 22B without the nozzles 25 on the pipes 24, two or more heat exchanging units 22A and/or two or more heat exchanging units 22B may be provided. It is also possible that only one or more heat exchanging units 22A are provided.

Figure 13:
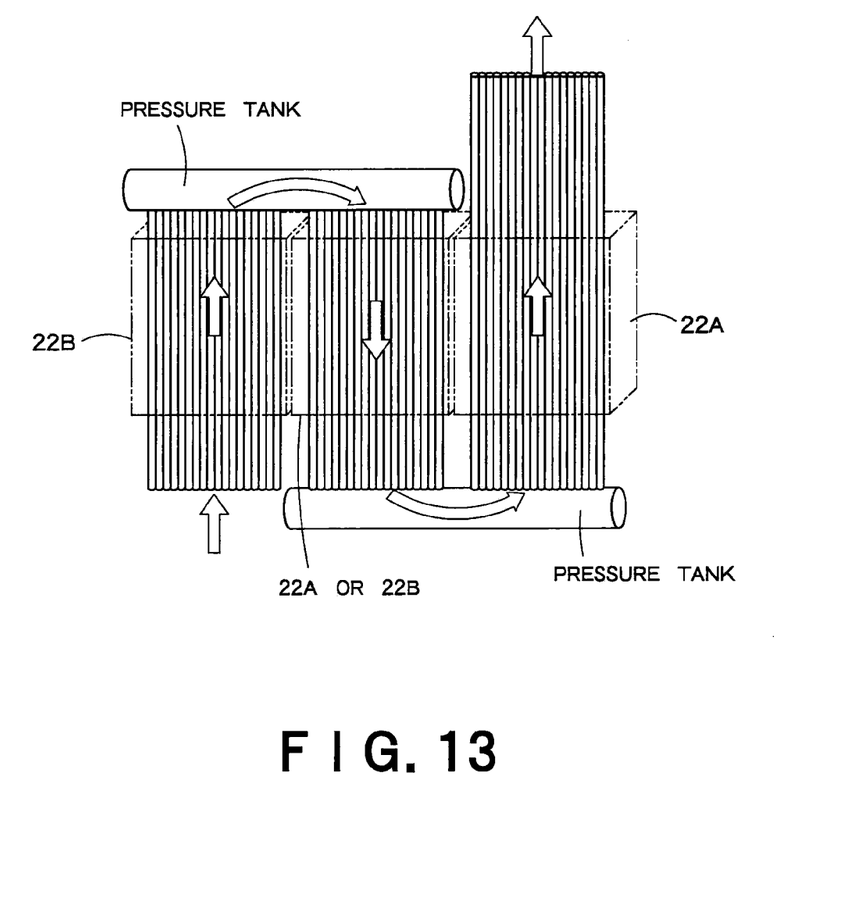
FIG. 13 is a schematic block diagram of a heat receiving unit according to a variation.

Although the structure described in the above embodiment includes the heat exchanging units 22A and 22B disposed at upper and lower positions, the heat exchanging units 22A and 22B may be disposed at left and right positions as shown in FIG. 13. The heat exchanging unit 22B is disposed on an upstream side of the flow of the heat medium 23 and the heat exchanging unit 22A is disposed on a downstream side.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A solar heat collecting apparatus comprising:
a first heat exchanging unit including a first pipe through which a heat medium flows and a first heat receiving face which receives heat of sunlight reflected by a plurality of reflecting units, the first heat exchanging unit heating the heat medium flowing through the first pipe by using heat of the first heat receiving face; and
a second heat exchanging unit including a second pipe through which the heat medium heated by the first heat exchanging unit flows, a second heat receiving face which receives heat of the sunlight reflected by a plurality of reflecting units, and a plurality of nozzles provided to the second pipe to discharge the heat medium flowing through the second pipe toward a back face of the second heat receiving face, the plurality of nozzles being provided from an upstream side to a downstream side of the second pipe.

2. The solar heat collecting apparatus according to claim 1, wherein the plurality of nozzles are disposed at regular intervals.

3. The solar heat collecting apparatus according to claim 1, wherein the plurality of nozzles are disposed in a staggered arrangement.

4. The solar heat collecting apparatus according to claim 1, wherein a diameter of a discharge port of the nozzle disposed on a downstream side of a flow of the heat medium is larger than a diameter of a discharge port of the nozzles disposed on an upstream side.

5. The solar heat collecting apparatus according to claim 1, wherein a number of the nozzles for discharging the heat medium is adjusted based on an amount of heat energy incident on the second heat receiving face.

6. The solar heat collecting apparatus according to claim 1, wherein the second pipe has a larger diameter on an upstream side of a flow of the heat medium than on a downstream side.

7. The solar heat collecting apparatus according to claim 1, wherein a guide unit which guides the heat medium discharged from the nozzles leftward and rightward is provided on the back face of the second heat receiving face.

8. The solar heat collecting apparatus according to claim 1, further comprising a tank provided to a bottom portion of the second heat exchanging unit to store the heat medium which is discharged from the nozzles, comes in contact with the back face of the second heat receiving face, and falls down to the tank.

9. The solar heat collecting apparatus according to claim 1, wherein a downstream end portion of the second pipe is closed.

10. The solar heat collecting apparatus according to claim 1, wherein a swirl structure is provided in the first pipe.

11. The solar heat collecting apparatus according to claim 1,
wherein the second pipe comprises an outer pipe in contact with the second heat receiving face and an inner pipe provided inside the outer pipe,
the heat medium flows through the inner pipe, and
the nozzles are provided to the inner pipe to discharge the heat medium toward an inner wall face of the outer pipe.

12. The solar heat collecting apparatus according to claim 1, wherein the first heat exchanging unit is provided below the second heat exchanging unit.

13. The solar heat collecting apparatus according to claim 1, wherein the first heat exchanging unit and the second heat exchanging unit are disposed at left and right positions.

14. A solar power generation system comprising:
a solar heat collecting apparatus comprising
- a first heat exchanging unit including a first pipe through which a heat medium flows and a first heat receiving face which receives heat of sunlight reflected by a plurality of reflecting units, the first heat exchanging unit heating the heat medium flowing through the first pipe by using heat of the first heat receiving face, and
- a second heat exchanging unit including a second pipe through which the heat medium heated by the first heat exchanging unit flows, a second heat receiving face which receives heat of the sunlight reflected by a plurality of reflecting units, and a nozzle provided to the second pipe to discharge the heat medium flowing through the second pipe toward a back face of the second heat receiving face; and
- a power generation unit including a heat exchanger for carrying out heat exchange between the heat medium heated by the solar heat collecting apparatus and water to generate steam, a turbine to be driven for rotation by the steam, a power generator connected to a turbine shaft of the turbine, and a condenser for condensing the steam discharged from the turbine.

15. The solar power generation system according to claim 14, further comprising a heat exchanging tank provided between the first pipe and the second pipe to heat the water discharged from the condenser by using the heat medium heated by the first heat exchanging unit,
wherein the water heated by the heat exchanging tank is supplied to the heat exchanger of the power generation unit.

16. The solar power generation system according to claim 14, wherein a plurality of nozzles are provided from an upstream side to a downstream side of the second pipe.

17. The solar power generation system according to claim 16, wherein a diameter of a discharge port of the nozzles disposed on a downstream side of a flow of the heat medium is larger than a diameter of a discharge port of the nozzles disposed on an upstream side.

18. The solar power generation system according to claim 14, wherein the second pipe has a larger diameter on an upstream side of a flow of the heat medium than on a downstream side.

19. The solar power generation system according to claim 14, wherein a guide unit which guides the heat medium discharged from the nozzle leftward and rightward is provided on the back face of the second heat receiving face.

* * * * *